July 25, 1967  B. W. SPEAR  3,332,569

CATHODE-RAY TUBES

Filed Dec. 18, 1964

INVENTOR.
BURTON W. SPEAR

BY
ATTORNEYS

United States Patent Office 3,332,569
Patented July 25, 1967

3,332,569
CATHODE-RAY TUBES
Burton W. Spear, Toledo, Ohio, assignor to Owens-Illinois Inc., a corporation of Ohio
Filed Dec. 18, 1964, Ser. No. 419,381
11 Claims. (Cl. 220—2.1)

The present invention relates to round cathode-ray picture tubes for television reception and, more particularly, to the control and prevention of fracture and the implosive-explosive effects resulting from fractures in sealed and vacuumized round cathode-ray picture tubes.

In the manufacture of television picture tubes having essentially all-glass envelopes, each tube is evacuated to a high degree of vacuum with the resultant effect of creating high external pressures over extensive areas of the tube. A detailed discussion of implosive-explosive effects resulting from fracture or breakage of the vacuumized glass envelope in sudden uncontrolled devacuation thereof may be had by reference to patent application Ser. No. 180,490, filed Mar. 19, 1962, now Patent No. 3,220,592, and Ser. No. 255,448, filed Sept. 24, 1964, now Patent No. 3,220,593, in both of which I appear as co-inventor. The co-pending applications referenced above are assigned to the assignee of the present application and are directed to a tube construction which is resistant to both fracture and sudden devacuation without serious fragmentation.

Prior to the inventions described in the above-referenced co-pending applications, it was necessary to provide a transparent implosion plate usually consisting of a tempered glass panel mounted adjacent and fully coextensive with the tube viewing portion. Alternately, a contoured implosion plate was bonded to the tube viewing area as an integral component part of the tube to resist implosion-explosion effects. However, in both types of tube construction and mounting, whether the tube be unlaminated with a separate protection panel or laminated with an implosion plate integrally mounted thereon, the tubes may still be subject to destructive implosion either spontaneously or from thermal or physical shock.

In such implosions, the glass of the envelope funnel sidewalls may break violently in such manner as to destroy component parts of the receiver by fragments being projected forcefully in random directions. The several types of implosion panels serve to restrain glass fragmentation in a forward direction and the separate panel serves to absorb front impacts delivered to the tube viewing portion. However, in all cases either a separate or integral implosion plate adds substantially to the cost of the tube per se or its mounting in a receiver cabinet. Further, the implosion plate having substantial dimensions and wall thickness adds to the overall weight and dimensions of the receiver and, in combination with the tube face plate, must provide proper light transmitting characteristics while protecting viewing areas of the tube against implosion effects.

The above-referenced co-pending applications disclose an integrally safe cathode-ray tube (i.e. one which may be used without the necessity of providing an implosion panel) wherein a circumferential tension band and a circumferential rim band of high tensile strength material closely surround and encompass the non-viewing periphery of the envelope viewing portion at substantially the area of maximum cross-sectional dimensions of the envelope to prevent fracture propagation therethrough upon breakage of the envelope from any source.

It has now been determined that a round cathode-ray tube envelope can be manufactured to be integrally safe by the application of a single tension band thus obviating the necessity of adhering the expensive rim band to envelope. Furthermore, such integral safety is achieved without adhering high tensile strength material to non-viewing external surfaces of the body or funnel portion as described in the above referenced applications.

Accordingly, it is an object of the present invention to provide an economical, integrally safe, round cathode-ray picture tube.

It is a further object of the present invention to provide a round cathode-ray picture tube having a single tension band capable of passing Underwriters Laboratories tests as being integrally safe for consumers.

Another object of the present invention is to provide a round integrally safe cathode-ray tube characterized by an annular tension band snugly surrounding the peripheral sidewall region of the viewing portion and which, in the preferred embodiment, is tensioned beyond the yield point of the metal used in forming the band.

Other objects and advantages of the present invention will become readily apparent to those skilled in the art from the following detailed description in which.

Figure 1:
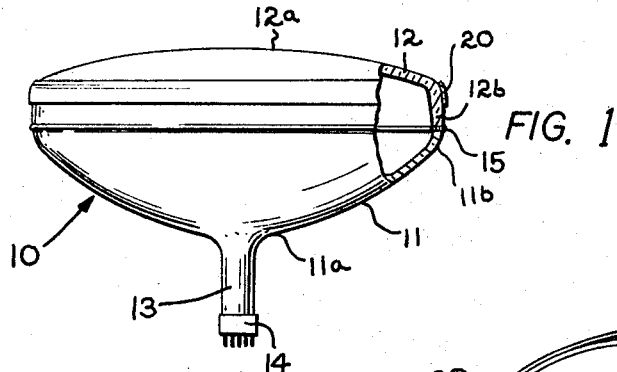
FIGURE 1 is a top plan view partly in section of a cathode-ray television picture tube fabricated in accordance with the present invention.
Figure 2:
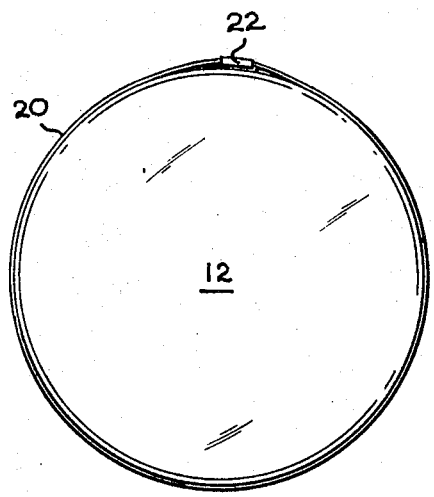
FIGURE 2 is a front elevational view of the cathode-ray television picture tube illustrated in FIGURE 1 showing the tension band applied to the face plate.

The present invention is described hereinbelow as specifically applied to the manufacture of a television cathode-ray image tube; however, it will be apparent to those skilled in the art that the invention is fully applicable to the manufacture of many different types of round evacuated glass envelopes, particularly those having substantial dimensions which are subject to implosion and explosion on sudden devacuation. In brief, the present invention contemplates a round cathode-ray image tube in which compressive forces are imparted to the exterior peripheral sidewall region of the viewing portion and in which such compressive forces are equalized around such peripheral sidewall region. The preferred way of equalizing such compressive forces is to apply a strap of annealed steel to such peripheral sidewall region and to pull such steel beyond its yield limit to thereby cause it to closely conform to all portions of said peripheral sidewall.

As pointed out in the above-referenced co-pending applications, television picture tube envelopes are subjected to various tests by the Underwriters Laboratories. Investigations have shown that round cathode-ray picture tubes having a carefully controlled and carefully equalized band of compressive stress applied to the peripheral sidewall region of the viewing portion were capable of passing the rigid Underwriters Laboratories tests even though the non-viewing external surfaces of the body portions were free of the high tensile strength material previously required for integrally safe, direct-viewing picture tubes, thus permitting greater economies of manufacture than heretofore possible.

Referring now to the drawings, there is provided a glass cathode-ray picture tube envelope generally designated 10 comprising a funnel member 11, face plate member 12, and neck tubulation 13 which are joined to form a unitary hollow glass article. The terminating end of neck 13 has mounted thereon a gun socket 14 connected to one or more electron beam emitting guns. Funnel member 11 is generally frusto-conical in shape with its small end 11a sealed to neck 13 and its large end 11b sealed to face plate 12. Electromagnetic beam deflecting coils (not shown) are normally mounted at the yoke area where neck 13 and funnel small end 11a are joined to provide proper scanning of the tube screen.

The face plate 12 consists of a concavo-convex viewing portion 12a bounded by a depending circular side panel or flange 12b. The face plate flange 12b and the large end 11b of the funnel member terminate in an annular sealing surface of complemental contour. The sealing surfaces are joined at a seal line 15 either by direct fusion of the glass or by an interposed annular layer of low-melting glass sealing composition which is selected as being compatible with the thermal and physical characteristics of the parent glass parts. In the drawings, the picture tube envelope is illustrated as having the face plate 12 secured to the funnel member 11 by means of a low-melting solder glass as is well known in the art of making picture tubes for color television receivers.

The picture tube envelope 10 is provided with a tension band 20 consisting of high tensile strength material such as annealed steel strapping. The tension band 20 is placed around the envelope 10 in an area overlying the face plate flange 12b and is drawn by any preferred tensioning means to a tension at which the compressive forces exerted upon the flange 12b are substantially equalized. A preferred method of equalizing the compressive forces directed to the flange 12b is to pull the band 20 beyond the yield point of the steel. Thereafter, a connecting clip 22 is crimped to form a permanent connection of the band ends. Preferably, the clip 22 does not contact the glass directly, but rather seats against one end of the band 20 which is doubled thereunder and thus interposed between the glass and the clip 22.

Figure 6:
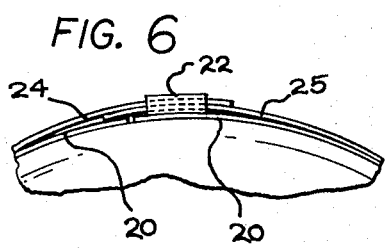
FIGURE 6 is a view similar to FIGURE 3 showing a modified construction for securing the ends of the band.
Figure 4:
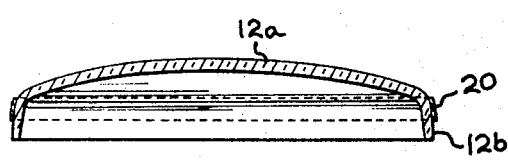
FIGURE 4 is a sectional view taken through the center of the face plate.
Figure 3:
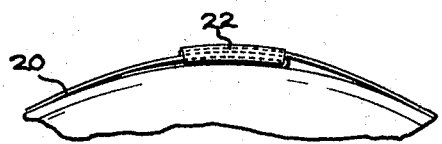
FIGURE 3 is an enlarged fragmentary view of FIGURE 2 showing the ends of the tension band joined by a connecting clip.
Figure 5:
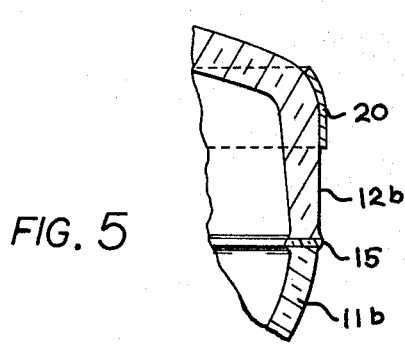
FIGURE 5 is an enlarged fragmentary sectional view of a corner portion of the face plate showing its junction with the funnel member.

An alternate clip connection is illustrated in FIGURE 6 where the band 20 has a length substantially equal to the circumference of the underlying portion of the face plate 12. A first strip 24 and a second strip 25 are secured, as by spot welding, near opposite ends of the band 20. The strips 24 and 25 are overlapped, grasped by a tensioning device, pulled to effect the desired tension on the band 20, and secured by the connecting clip 22. Here, as in the previous embodiment, the clip 22 does not contact the glass directly, but rather has its inner flange interposed between the outer surface of band 20 and the inner surface of strip 25.

Where it is desired to pull the band 20 beyond its yield point, the strips 24 and 25 are, preferably, formed from tempered steel having a yield point greater than that of the annealed steel band 20. The embodiment shown in FIGURE 6 provides a connecting means in which the band 20 is tightly engaged to the face plate 12 with its ends in substantially abutting relationship rather than in overlapping relationship as is the case of the embodiment illustrated in FIGURE 3. The embodiment of FIGURE 6 by virtue of the abutting relationship of the band ends permits the band to exert exceptionally uniform compressive stresses against the face plate flange 12b.

Under either embodiment, the flange 12b is thus encircled and tightly compressed by the inner surface of the tension band 20 which is presented against the external surface of the flange 12b to thereby result in substantially equalized compressive stresses being exerted against such flange. Surprisingly, the application of equalized compressive stresses in the flange area of a circular TV bulb results in an integrally safe television tube envelope which is capable of withstanding the rigid Underwriters Laboratories tests. The apparent reason for the ability of this economical cathode-ray tube envelope to meet the Underwriters Laboratories tests lies in the fact that the tension band placed a major portion of the face plate viewing portion 12a in compression and that the areas of tension and compression in the face plate viewing portion are so distributed as to provide a symmetrical pattern. Additionally, the impacting of an object on the external concave surface of the face plate viewing portion causes the flange 12b to be urged radially outwardly. The tension band 20 uniformly restrains such outward urging of the flange 12b, thereby impeding breakage in the flange 12b. Additionally, although the band 20 is located away from the seal line 15, its action in restraining the outward urging of the flange 12b reduces the degree of tension that would otherwise be imparted to the seal upon the impacting of an object against the face plate viewing portion 12a. By virtue of the fact that the tension band is located away from the seal line 15, it is possible, if desired, to apply it to the face plate prior to the joining of the face plate 12 to the funnel member 11.

It can be readily seen that the present invention provides a cathode-ray tube envelope which can be manufactured with far greater economies than any which have been heretofore proposed.

Numerous modifications of the present invention will become readily apparent to those skilled in the art. Accordingly, the scope of the present invention should be limited only by the scope of the appended claims.

I claim:

1. An essentially all-glass cathode-ray tube envelope resistant to breakage and capable of preventing implosions upon breakage comprising a substantially funnel-shaped hollow body portion having a viewing portion enclosing its larger end and a neck tubulation projecting from its smaller end, said viewing portion having a substantially dome-shaped light-transmitting viewing panel, said panel being domed outwardly away from said neck tubulation, and an integral peripheral sidewall region the outer periphery of which substantially defined a circle, and reinforcing means exteriorly surrounding the peripheral sidewall region of said viewing portion including an annular reinforcing band of high-tensile strength material encircling said peripheral sidewall region, said reinforcing band being comprised of annealed steel tensioned beyond its yield point to exert compressive forces against said peripheral sidewall, said compressive forces being substantially equally distributed about said sidewall.

2. A cathode-ray tube envelope in accordance with claim 1 wherein said reinforcing band is in direct contact with said peripheral sidewall region.

3. A cathode-ray tube envelope in accordance with claim 1 wherein said reinforcing band is formed of a strap substantially equal in length to the circumference of said peripheral sidewall and further including means for securing said strap to said peripheral sidewall with its ends in abutting relationship, said means being maintained out of contact with said peripheral sidewall.

4. A cathode-ray tube envelope in accordance with claim 3 wherein said means for securing said strap to said peripheral sidewall comprises a first strip of high-tensile strength material secured to one end of said strap at the outer surface thereof, a second strip of high-tensile strength material secured to the other end of said strap at the outer surface thereof, and means for joining said strips.

5. A cathode-ray tube envelope in accordance with claim 4 wherein said strips have a higher yield point than said band.

6. An essentially all-glass cathode-ray tube envelope resistant to breakage and capable of preventing implosions upon breakage comprising a substantially funnel-shaped hollow body portion having a viewing portion enclosing its larger end and a neck tubulation projecting from its smaller end, said viewing portion having a substantially dome-shaped light-transmitting viewing panel, said panel being domed outwardly away from said neck tubulation, and an integral peripheral sidewall region the outer periphery of which substantially defines a circle, reinforcing means exteriorly surrounding the peripheral sidewall region of said viewing portion including an annular reinforcing band of metal encircling said peripheral sidewall region in direct contact therewith, said band being tensioned beyond the yield strength of said metal to exert compressive forces against said peripheral sidewall, said compressive forces being substantially equally distributed about said sidewall, and means for holding the ends of said band in abutting relationship including a first strip of metal secured to one end of said band at the outer surface thereof, a second strip of metal secured to the other end of said band at the outer surface thereof and means for securing said strips together.

7. A face plate for an essentially all-glass cathode-ray tube envelope resistant to breakage and capable of preventing implosions upon breakage comprising a substantially dome-shaped light-transmitting viewing panel, said panel having a convex viewing surface and an integral peripheral sidewall region the outer periphery of which substantially defines a circle, and reinforcing means exteriorly surrounding said peripheral sidewall region including an annular reinforcing band of high-tensile strength material encircling said peripheral sidewall region, said reinforcing band being comprised of annealed steel tensioned beyond its yield point to exert compressive forces against said peripheral sidewall, said compressive forces being substantially equally distributed about said sidewall.

8. A cathode-ray tube envelope in accordance with claim 7 wherein said reinforcing band is in direct contact with said peripheral sidewall region.

9. A cathode-ray tube envelope in accordance with claim 7 wherein said reinforcing band is formed of a strap substantially equal in length to the circumference of said peripheral sidewall and further including means for securing said strap to said peripheral sidewall with its ends in abutting relationship, said means being maintained out of contact with said peripheral sidewall.

10. A cathode-ray tube envelope in accordance with claim 7 wherein said means for securing said strap to said peripheral sidewall comprises a first strip of high-tensile strength material secured to one end of said strap at the outer surface thereof, a second strip of high-tensile strength material secured to the other end of said strap at the outer surface thereof, and means for joining said strips.

11. A cathode-ray tube envelope in accordance with claim 10 werein said strips have a higher yield point than said band.

References Cited
UNITED STATES PATENTS

| | | | |
|---|---|---|---|
| 2,785,820 | 3/1957 | Vincent et al. | 220—2.1 |
| 2,874,017 | 2/1959 | Henry et al. | |
| 2,951,167 | 8/1960 | Kegg et al. | 220—2.1 X |

FOREIGN PATENTS

| | | |
|---|---|---|
| 753,696 | 7/1956 | Great Britain. |

THERON E. CONDON, *Primary Examiner.*

MARTHA L. RICE, *Examiner.*